United States Patent
Kirschner et al.

(10) Patent No.: US 6,948,420 B2
(45) Date of Patent: Sep. 27, 2005

(54) COFFEE AND TEA POD

(75) Inventors: Jonathan Kirschner, Powder Springs, GA (US); Charles Bradley Green, Lawrenceville, GA (US); Michael Alan Masters, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/604,445

(22) Filed: Jul. 22, 2003

(65) Prior Publication Data
US 2005/0016383 A1 Jan. 27, 2005

(51) Int. Cl.[7] .............................................. A47J 31/00
(52) U.S. Cl. ............................ 99/295; 99/323; 426/77; 426/82
(58) Field of Search .................... 99/295, 323; 426/77, 426/82; 220/213, 253, 305, 780, 315, 797, 798

(56) References Cited

U.S. PATENT DOCUMENTS

| | | | |
|---|---|---|---|
| 2,968,560 A | 1/1961 | Goros | 99/77.1 |
| 3,589,272 A | 6/1971 | Bouladon | 99/295 |
| 3,812,273 A | 5/1974 | Schmidt | 426/433 |
| 3,823,656 A | 7/1974 | Vekekn | 99/295 |
| 3,952,641 A | 4/1976 | Vitous | 99/295 |
| 4,158,330 A | 6/1979 | Vitous | 99/295 |
| 4,254,694 A | 3/1981 | Illy | 99/295 |
| 4,429,623 A | 2/1984 | Illy | 99/295 |
| 4,471,689 A * | 9/1984 | Piana | 99/295 |
| 4,581,239 A | 4/1986 | Woolman et al. | 426/433 |
| 4,644,855 A | 2/1987 | Woolman et al. | 99/280 |
| 4,775,048 A * | 10/1988 | Baecchi et al. | |
| 4,829,889 A | 5/1989 | Takeuchi et al. | 99/289 P |
| 4,846,052 A | 7/1989 | Favre et al. | 99/295 |
| 4,860,645 A | 8/1989 | van der Lijn et al. | 99/295 |
| 4,886,674 A | 12/1989 | Seward et al. | 426/79 |
| 4,941,399 A | 7/1990 | Zucchetti | 99/289 |
| 4,995,310 A | 2/1991 | van der Lijn et al. | 99/295 |
| 4,995,978 A | 2/1991 | Van de Gang | 210/474 |
| 5,134,924 A | 8/1992 | Vicker | 99/280 |
| 5,190,652 A | 3/1993 | van Thoor et al. | 210/474 |
| 5,197,374 A | 3/1993 | Fond | 99/295 |
| 5,325,765 A | 7/1994 | Sylvan et al. | 99/295 |
| 5,343,799 A | 9/1994 | Fond | 99/295 |
| 5,347,916 A | 9/1994 | Fond et al. | 99/295 |
| 5,398,595 A | 3/1995 | Fond et al. | 99/295 |
| 5,398,596 A | 3/1995 | Fond | 99/295 |
| 5,402,707 A | 4/1995 | Fond et al. | 99/295 |
| 5,472,719 A * | 12/1995 | Favre | 426/77 |
| 5,505,120 A | 4/1996 | Albertson | 99/286 |
| 5,637,335 A | 6/1997 | Fond et al. | 426/84 |
| 5,638,741 A | 6/1997 | Cisaria | 99/295 |

(Continued)

FOREIGN PATENT DOCUMENTS

| | | |
|---|---|---|
| BE | 701.863 | 2/1968 |
| EP | 2 617 389 A1 | 6/1987 |
| EP | 0 326 099 A1 | 1/1989 |
| EP | 0 780 307 A1 | 10/1996 |
| EP | 0 780 310 A1 | 10/1996 |
| EP | 0 780 370 A3 | 10/1996 |
| EP | 1 042 978 A1 | 4/2000 |
| WO | WO 93/17932 | 3/1992 |
| WO | WO 93/17932 * | 9/1993 |
| WO | WO 98/23196 | 11/1996 |
| WO | WO 01/60220 A1 | 2/2001 |
| WO | WO 01/60712 A1 | 2/2001 |

*Primary Examiner*—Reginald L. Alexander
(74) *Attorney, Agent, or Firm*—Sutherland Asbill & Brennan LLP

(57) ABSTRACT

A container for holding ground coffee or tealeaves. The container may include a body and a lip extending from the body. The lip may include a top substantially flat surface and a width of no more than about 2.6 millimeters (about 0.1 inch).

18 Claims, 7 Drawing Sheets

U.S. PATENT DOCUMENTS

| | | | |
|---|---|---|---|
| 5,824,218 A * | 10/1998 | Gasser et al. | 210/337 |
| 5,840,189 A | 11/1998 | Sylvan et al. | 210/474 |
| 5,855,161 A | 1/1999 | Cortese | 99/289 P |
| 6,079,315 A | 6/2000 | Beaulieu et al. | 99/289 R |
| 6,082,247 A | 7/2000 | Beaulicu | 99/302 R |
| 6,095,032 A | 8/2000 | Barnett et al. | 99/286 |
| 6,103,116 A | 8/2000 | Koslow et al. | 210/282 |
| 6,142,063 A | 11/2000 | Beaulieu et al. | 99/283 |
| 6,182,554 B1 | 2/2001 | Beaulieu et al. | 99/289 R |
| 6,186,051 B1 * | 2/2001 | Aarts | 99/295 |
| 6,440,256 B1 | 8/2002 | Gordon et al. | 156/293 |
| 6,517,880 B2 | 2/2003 | Walters, Jr. et al. | 426/433 |
| 2001/0052294 A1 | 12/2001 | Schmed | 99/295 |
| 2002/0059870 A1 | 5/2002 | Walters, Jr. et al. | 99/298 |
| 2003/0145736 A1 | 8/2003 | Green | 99/280 |

* cited by examiner

COFFEE AND TEA POD

BACKGROUND OF INVENTION

1. Technical Field

The present invention relates generally to a container for brewing material and more particularly relates to a pod for use in the automatic brewing of coffee, tea, and other beverages.

2. Background of the Invention

Various types of automatic coffee and tea dispensers are known. Generally described, these dispensers hold a measure of ground coffee, tealeaves, or other type of brewable material in a container of some sort. Hot water generally is added to the material so as to brew the beverage. The material is generally held in some sort of disposable container that must be opened or penetrated so as to allow the hot water to pass therethrough.

One drawback with these known brewing devices, however, is that the elements of the device that come into contact with the brewing material generally must be cleaned. Further, the container for the material must be inserted and aligned in the dispenser for each beverage. As a result, the beverage dispenser as a whole may be somewhat slow between beverage cycles as the container is inserted, aligned, removed and/or the dispenser elements are cleaned.

There is a desire therefore, for a device that brews a beverage with a quick cycle time. The device preferably should be relatively inexpensive and easy to use and produce a high quality beverage. Likewise, the device preferably should be adaptable for different types of brewing materials and amounts.

SUMMARY OF INVENTION

The present invention thus may provide for a container for holding ground coffee or tealeaves. The container may include a body and a lip extending from the body. The lip may include a top substantially flat surface and a width of no more than about 2.6 millimeters (about 0.1 inch).

The body may include a sidewall and a base. The base may include a number of apertures therein, a number of support ribs thereon, and a number of spikes thereon. Each of the spikes may include a base surrounded by a number of blades.

The lip may include a flange extending from the flat surface. The flange may extend downwardly at an angle so as to form a pocket with the body. The pocket may include an upper curved radius.

The container also may include a lid positioned within the body. The lid may include a concave shape and a number of apertures therein. The body may include one or more over-cuts therein for the lid.

The container also may include one or more layers of filter paper positioned within the body. A foil envelope for holding the ground coffee or the tealeaves also may be used. The container may be made of polystyrene, polyethylene, or polypropylene.

A further embodiment of the present invention may provide for a container for holding ground coffee or tealeaves. The container may include a base with a number of apertures therein, a circular sidewall extending from the base, and a lip extending from the sidewall. The lip may include a top substantially flat surface and a flange extending downwardly from the flat surface. The flange may include a width of no more than about 2.6 millimeters (about 0.1 inch). The base may include a number of spikes thereon.

A further embodiment of the present invention may provide for a dispenser for brewing a beverage from a beverage material. The dispenser may include a pod with the beverage material therein, a pod holder, and an injection head. The pod may include a lip extending from a body. The pod holder may be adapted to receive the pod therein and support the lip of the pod. The injection head may include about 136 to 160 kilograms (about 300 to 350 pounds) of force applied to the lip of the pod. The dispenser further may include a number of pods.

The pod may include about five (5) to about eight (8) grams of a plastic material. The dispenser further may include a turret assembly such that the turret assembly may include the pod holder and an injector assembly such that the injector assembly may include the injection head. The injector assembly may include a drive mechanism so as to maneuver the injection head. The drive mechanism may maneuver the injection head about 6.4 to about 12.7 millimeters (about one-quarter to about one-half inches) in a substantially vertical direction. The lip may include a substantially flat top surface and the injection head may include a sealing ring sized to accommodate the flat top surface. The injection head provides water pressurized at about 1.4 to 14 kilograms per square centimeter (about 20 to about 200 pounds per square inch) to the pod. The body may include a number of spikes therein.

A method of the present invention may provide for preparing a beverage from a beverage material. The method may include placing the beverage material within a container, tamping the beverage material down with a lid of the container, positioning the lid into the container, and injecting the container with water pressurized water at about 1.4 to 14 kilograms per square centimeter (about 20 to about 200 pounds per square inch).

These and other features of the present invention will become apparent upon review of the following detailed description of the preferred embodiments when taken in conjunction with the drawings and the appended claims.

DETAILED DESCRIPTION

Commonly owned U.S. patent application Ser. No. 10/071,643, entitled "COFFEE AND TEA DISPENSER", is incorporated herein by reference.

Figure 1:
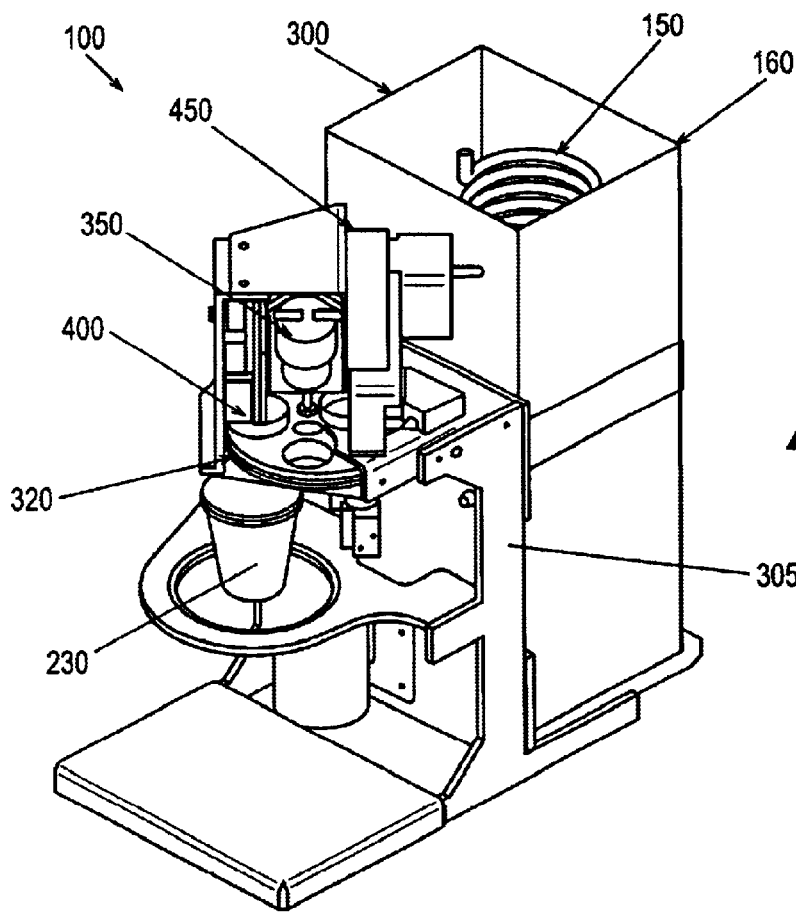
FIG. 1 is a perspective view of one embodiment of a beverage dispenser system for use with the present invention.
Figure 2:
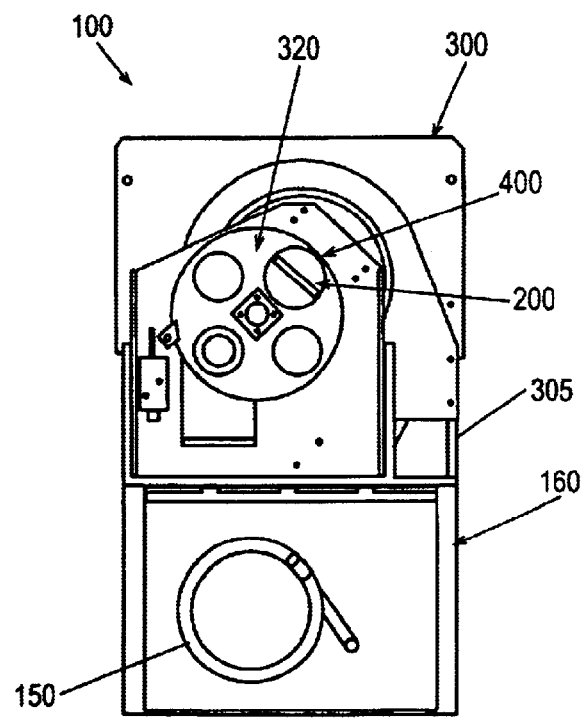
FIG. 2 is a top plan view of the beverage dispenser system of FIG. 1.

Referring now to the drawings, in which like numerals refer to like elements throughout the several views, FIGS. 1 and 2 show one application of a beverage dispenser system 100. In these figures, a pod brewing apparatus 300 is shown. The pod brewing apparatus 300 may include a heat exchanger 150 positioned within a hot water reservoir 160 and in communication with aninjection nozzle 200 as is shown. In this embodiment, the elements of the beverage dispenser system 100 as a whole are mounted onto a dispenser frame 305. The dispenser frame 305 may be made out of stainless steel, aluminum, other types of metals, or other types of substantially noncorrosive materials.

Figure 3:
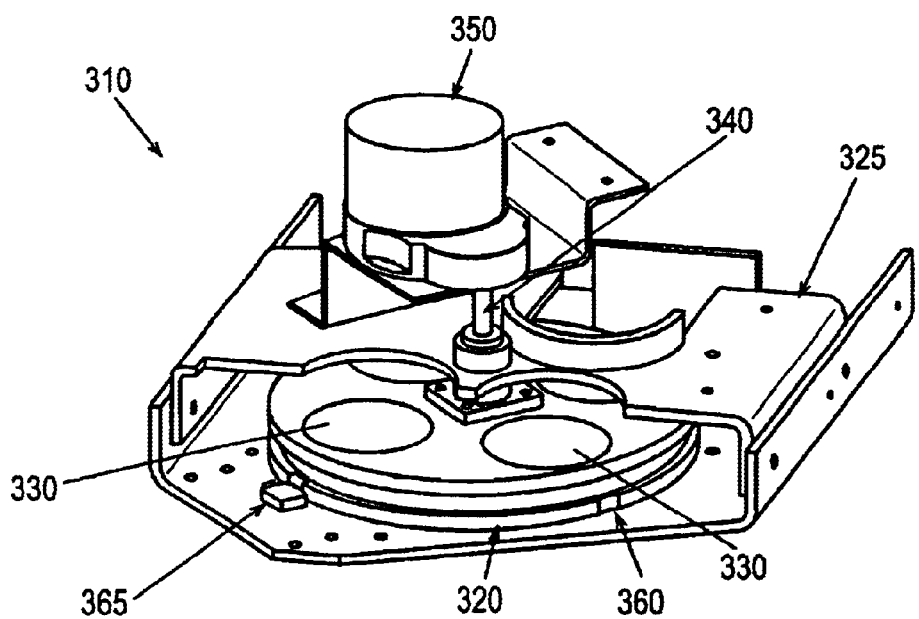
FIG. 3 is a perspective view of a turret system of the beverage dispenser system of FIG. 1.

The injection nozzle 200 may interact with one or more pod cartridges 210 so as to produce the desired beverage in a cup 230 or any other type of receptacle. The pod cartridges 210 may be positioned in the beverage dispenser system 100 within a turret assembly 310. The turret assembly 310 may be fixedly attached to the dispenser frame 305. As is shown in FIG. 3, the turret assembly 310 may include a turret plate 320 positioned within a turret frame 325. The turret frame 325 may be made out of stainless steel, aluminum, other types of conventional metals, or similar types of substantially noncorrosive materials. The turret plate 320 may be substantially circular. The turret plate 320 may include a number of pod apertures 330. The pod apertures 330 may be sized to accommodate the pod cartridges 210. The turret plate 320 may spin about a turret pin 340. A turret motor 350 may drive the turret assembly 310. The turret motor 350 may be a conventional AC motor or a similar type of device. The turret motor 350 may drive the turret assembly 310 at about six (6) to about thirty (30) rpm, with about twenty-five (25) rpm preferred.

The turret plate 320 also may have a number of detents 360 positioned about its periphery. The detents 360 may be positioned about each of the turret apertures 330. The detents 360 may cooperate with one or more limit switches 365 so as to control the rotation of the turret plate 320. The rotation of the plate 320 may be stopped when the limit switch 360 encounters one of the detents 360.

Positioned adjacent to the turret assembly 310 may be an injector assembly 400. The injector assembly 310 may be fixedly attached to the dispenser frame 305. The injector assembly 400 also may include an injector frame 410 extending above the turret assembly 310. The injector frame 410 may be made out of stainless steel, other types of metals, or similar types of substantially noncorrosive materials.

Figure 4:
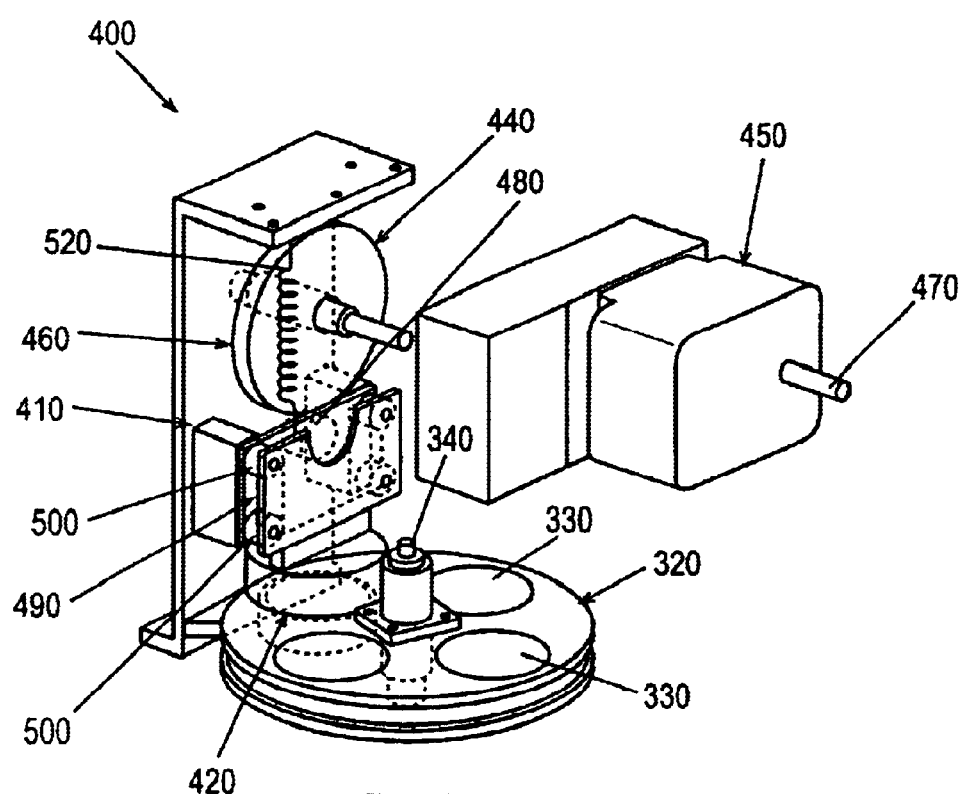
FIG. 4 is a perspective view of an injector assembly of the beverage dispenser system of FIG. 1, with the guide wheels and the return spring of the support plate shown in phantom lines.
Figure 5:
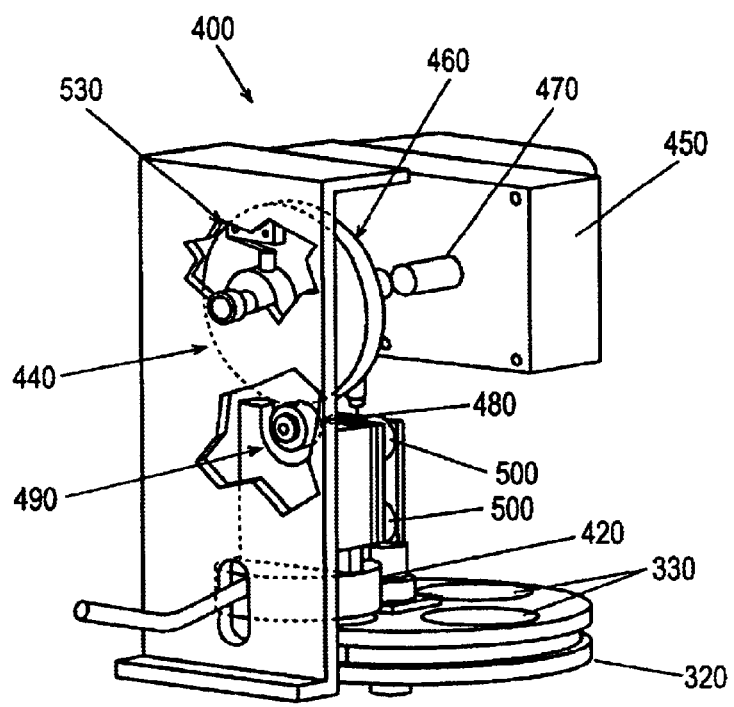
FIG. 5 is a rear perspective view of the injector assembly of the beverage dispenser system of FIG. 1, with the idler wheel and the limit switch shown in a cut away view.

As is shown in FIGS. 4 and 5, the injector assembly 400 may include the injection nozzle 200 as described above. The injection nozzle 200 may have a narrow tip so as to penetrate the pod cartridge 210 if needed or a wide mouth to accommodate the entire pod cartridge 210. The injector assembly 400 may include an injector head 420 that cooperates with the injection nozzle 200. The injector head 420 may be slightly larger in diameter than the pod cartridges 210. The injector head 420 also may be made out of stainless steel, plastics, or similar types of substantially non-corrosive materials. The injector head 420 may include a sealing ring 430 positioned about its lower periphery. The sealing ring 430 may be made out of rubber, silicone, or other types of elastic materials such that a substantially water tight seal may be formed between the injector head 420 and the pod cartridge 210. The heat exchanger 150 may be in communication with the injector head 420 so as to provide hot, pressurized water to the pod cartridges 210.

The injector head 420 may be moveable in a substantially vertical plane via a cam system 440. (The terms "vertical"and "horizontal"are used as a frame of reference as opposed to absolute positions. The injector head 420 and the other elements described herein may operate in any orientation.) A cam system drive motor 450 may drive the cam system 440. The drive motor 450 may be a conventional AC motor similar to the turret motor 350 described above. The drive motor 450 also may be a shaded pole or a DC type motor. The drive motor 450 may rotate an eccentric cam 460 via a drive belt system 470. The drive motor 450 and the gear system 470 may rotate the eccentric cam 460 at about six (6) to about thirty (30) rpm, with about twenty-five (25) rpm preferred. The eccentric cam 460 may be shaped such that its lower position may have a radius of about 4.1 to about 4.8 centimeters (about 1.6 to 1.9 inches) while its upper position may have a radius of about 3.5 to 4.1 centimeters (about 1.3 to about 1.7 inches).

The eccentric cam 460 may cooperate with an idler wheel 480. The idler wheel 480 may be in communication with and mounted within a support plate 490. The support plate 490 may maneuver about the injector frame 410. The support plate 490 may be made out of stainless steel, other types of steel, plastics, or other materials. The support plate 490 may be fixedly attached to the injector head 420. The support plate 490 may have a number of guide wheels 500 positioned thereon such that the support plate 490 can move in the vertical direction within the injector frame 410. A return spring 520 also may be attached to the support plate and the injector frame 410. A limit switch 530 may be positioned about the cam 460 such that its rotation may not exceed a certain amount.

The injector head 420 thus may maneuver up and down in the vertical direction via the cam system 440. Specifically, the drive motor 450 may rotate the eccentric cam 460 via the gear system 470. As the eccentric cam 460 rotates with an ever-increasing radius, the idler wheel 480 pushes the support plate 490 downward such that the injector head 420 comes in contact with a pod cartridge 210. The eccentric cam 460 may lower the injector head 420 by about 6.4 to about 12.7 millimeters (about one-quarter to about one-half inches). Once the injector head 420 comes into contact with the pod cartridge 210, the eccentric cam 460 may continue to rotate and increases the pressure on the pod cartridge 210 until the cam 460 reaches the limit switch 530. The injector head 420 may engage the pod cartridge 210 with a downward force of about 136 to 160 kilograms (about 300 to 350 pounds). The sealing ring 430 thus may form a substantially airtight and water tight seal about the pod cartridge 210. The drive motor 450 may hold the cam 460 in place for a predetermined amount of time. The cam system 440 may then be reversed such that the injector head 420 returns to its original position.

Once the injection nozzle 200 of the injector head 420 is in contact with the pod cartridge 210, the hot, high pressure water may flow from the heat exchanger 150 into the injector head 420. The water may be at about 82 to about 93 degrees Celsius (about 180 to about 200 degrees Fahrenheit). The incoming water flow may be pressurized at about 11 to about 14 kilograms per square centimeter (about 160 to 200 pounds per square inch). The pressure of the water passing through the pod cartridge 210 may be about 1.4 to about 14 kilograms per square centimeter (about 20 to about 200 pounds per square inch). The pressure of the water flowing through the pod cartridge 210 may vary with the nature of the beverage.

Figures 6, 7:
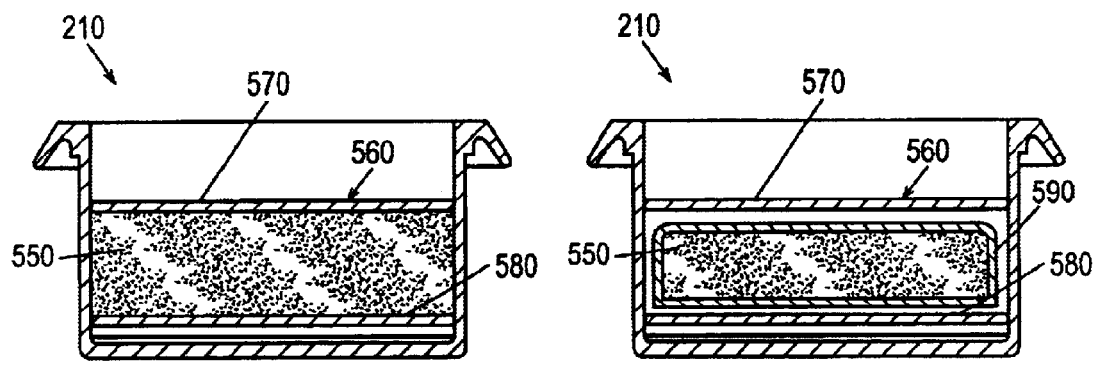
FIG. 6 is a side cross-sectional view of a configuration of brewing material for use with the present invention.
FIG. 7 is a side cross-sectional view of an alternative configuration of brewing material for use with the present invention.
Figure 8:
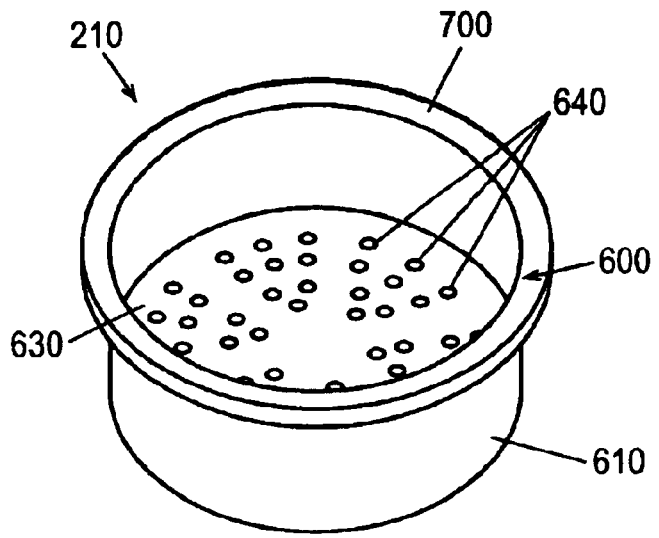
FIG. 8 is a top perspective view of a pod of the present invention.
Figure 9:
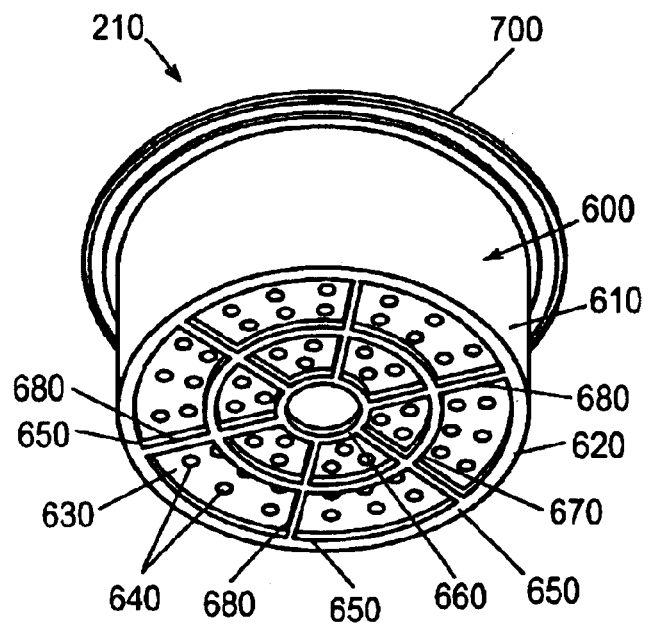
FIG. 9 is a bottom perspective view of the pod of FIG. 8.
Figure 10:
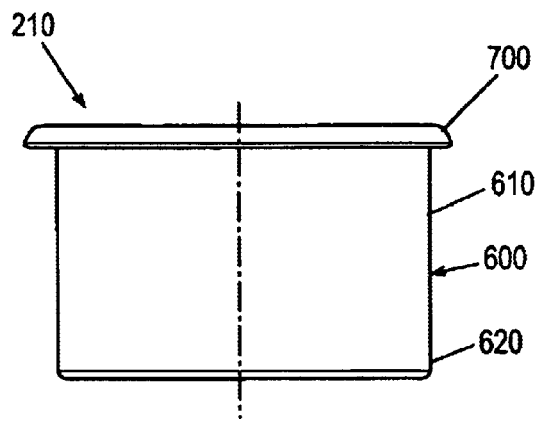
FIG. 10 is a side plan view of the pod of FIG. 8.
Figure 11:
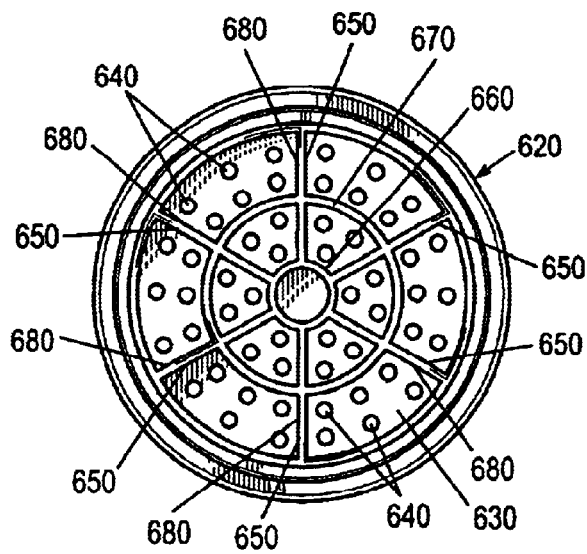
FIG. 11 is a bottom plan view of the pod of FIG. 8.
Figure 12:
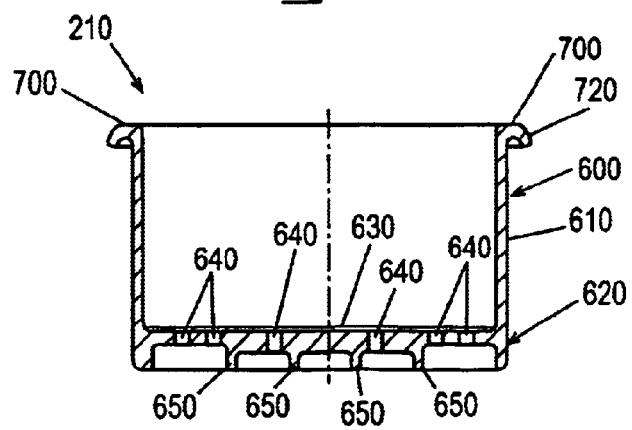
FIG. 12 is a side cross-sectional view of the pod of FIG. 8.

As is shown in FIGS. 6 and 7, the pod cartridges 210 may be filled with different types of grinds, leaves, or other types of a brewing material 550. In the case of a single serving sized espresso beverage of about thirty (30) milliliters, about six (6) to about eight (8) grams of espresso grinds may be placed in the pod cartridge 210. Likewise, about six (6) to about (8) grams of coffee grinds may be added to the pod cartridge 210 to produce about a 240 milliliter (about eight (8) ounce) cup of coffee. About three (3) to about five (5) grams of tealeaves may be added to the pod cartridge 210 in order to make about a 150 milliliter (about five (5) ounce) cup of tea.

The brewing material 550 may be positioned within one or more layers of filter paper 560. The filter paper 560 may be standard filter paper used to collect the brewing material 550 while allowing the beverage to pass therethrough. The pod cartridge may have an upper filter layer 570 and a lower filter layer 580. The brewing material 550 itself may be positioned directly between the upper and lower filter layers 570, 580. Alternatively, the brewing material 550 may be placed within a foil envelope 590. The foil envelope 590 may serve to keep the brewing material 550 therein fresh and out of contact with the ambient air. Alternatively, the entire pod cartridge 210 may be placed within a foil envelope, either individually or as a group, until the pod 210 is ready for use.

FIGS. 8–12 show an embodiment of the pod cartridge 210 that may be used with the beverage dispenser system 100 or in other types of beverage systems. The pod cartridge 210 may be substantially in the shape of a cup 600. The cup 600 may be made out of a conventional thermoplastic such as polystyrene, polyethylene, or polypropylene. Alternatively, stainless steel or other types of substantially non-corrosive materials also may be used. The cup 600 may be substantially rigid.

The cup 600 may include a substantially circular sidewall 610 and a substantially flat base 620. The sidewall 610 and the base 620 of the cup 600 may be molded and form a unitary element or a separate sidewall 610 and a separate base 620 may be fixedly attached to each other. The sidewall 610 and the base 620, as well as the cup 600 as a whole, may have any convenient diameter so as to accommodate the pod apertures 330 of the turret plate 320 of the turret assembly 310 and the injector head 420 of the injector assembly 400. Alternatively, the sidewall 610 and the base 620 of the cup 600 may have any convenient diameter so as to accommodate other any type of beverage dispenser system 100.

The sidewall 610 of the cup 600 may have any convenient depth so as to accommodate an appropriate amount of the brewing material 550. In this embodiment, the sidewall 610 may have an inside diameter of about 3.9 centimeters (about 1.535 inches), an outside diameter of about 4.03 centimeters (about 1.586 inches) and a wall thickness of about 1.295 millimeters (about 0.051 inches). The sidewall 610 also may have a depth of about 2.43 centimeters (about 0.955 inches) with the base 620 having an additional depth of about 0.318 centimeter (about 0.125 inches). Such a configuration of the sidewall 610 and the base 620 of the cup 600 may hold about six (6) to about sixteen (16) grams of the brewing material 550, depending upon the size of the desired beverage, i.e., eight (8), twelve (12), or sixteen (16) ounces. These dimensions are for purposes of example only. The sidewall 610 and the base 620 of the cup 600 may take any desired or convenient size or shape. For example, the sidewall 610 may be straight, tapered, stepped, or curved if desired.

The base 620 also may include a bottom floor 630. The bottom floor 630 may include a number of apertures 640 formed therein. The apertures 640 may extend through the width of the floor 630. In this embodiment, the apertures 640 may be largely circular in shape with a diameter of about 1.6 millimeters (about 0.063 inches). Any desired shape or size, however, may be used. In this embodiment, about 54 apertures 640 are used herein, although any number may be used. The base 620 also may include a number of support ribs 650 supporting the floor 630. An inner circular rib 660, an outer circular rib 670, and a number of radial ribs 680 may be used. Any design or number of ribs 660 may be used. In this embodiment, the ribs 650 may have a depth of about 2.54 millimeters (about 0.1 inch) and the floor 630 may have a depth of about 1.78 millimeters (about 0.07 inches), although any desired thickness may be used.

Figure 13:
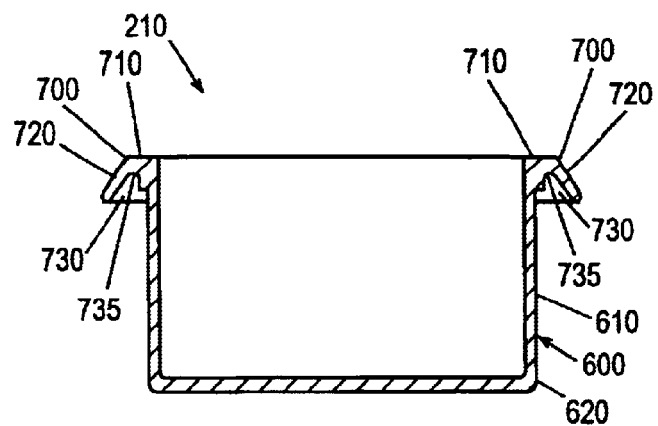
FIG. 13 is a side cross-sectional view of the lip of the pod of FIG. 8.

The sidewall 610 of the cup 600 also may include an upper lip 700. The upper lip 700 may include a substantially flat top portion 710 and a downwardly angled flange 720 extending from the top portion 710. The flange 720 may extend downwardly so as to form a pocket 730 with the sidewall 610. The top of the pocket 730 may form a curved inner radius 735. As is shown in FIG. 13, the sidewall 610 may or may not include an outer step 740 within the pocket 730.

In this embodiment and by way of example only, the flat top portion 710 of the upper lip 700 may have width of about 2.54 millimeters (about 0.1 inch) extending in the vertical direction. The flange 720 may have the length of about 2.2 millimeters (about 0.087 inch). The flange 720 and the pocket 730 of the lip 700 arc sized to accommodate the size of the pod apertures 330. Specifically, the lip 700 is configured to accommodate the size of the pod apertures 330 and the expected force of the injector head 420 while using as little material as possible.

Figure 14:
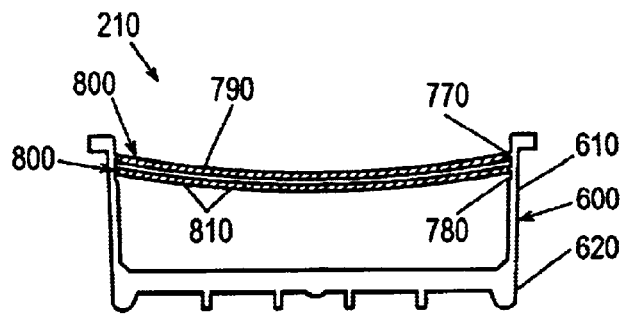
FIG. 14 is a side cross-sectional view of an alternative embodiment of a pod of the present invention with a lid thereon[115]
Figure 15:
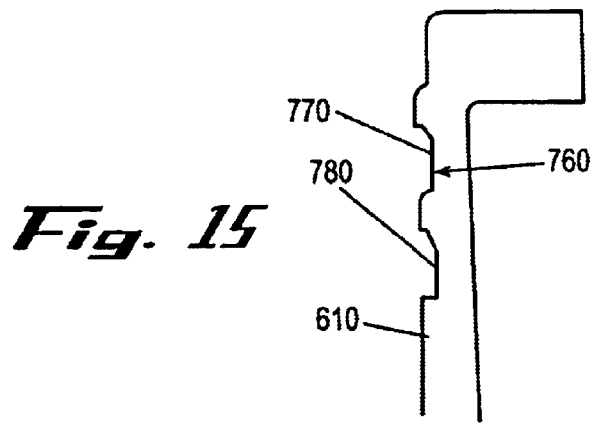
FIG. 15 is a side cross-sectional view of the interior wall of the pod of FIG. 14FIG. 16 is a perspective view of an alternative embodiment of a pod of the present invention.
Figure 16:
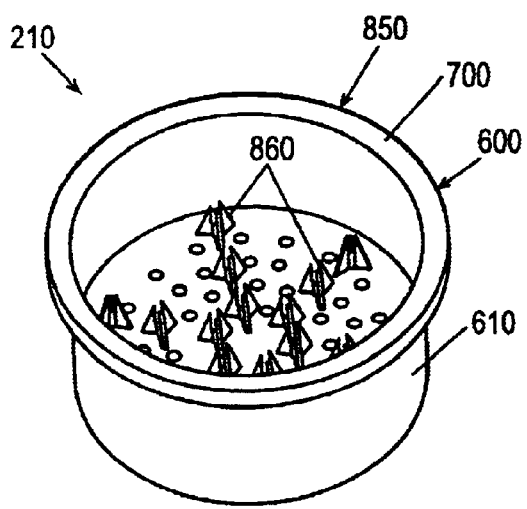
Figure 17:
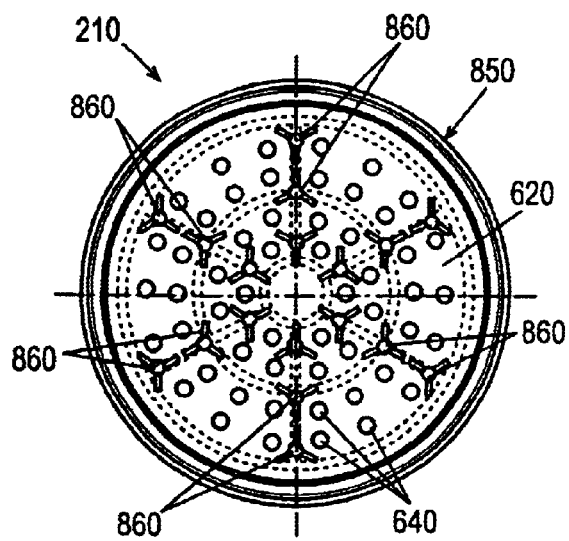
FIG. 17 is a top plan view of the pod of FIG. 16.
Figure 18:
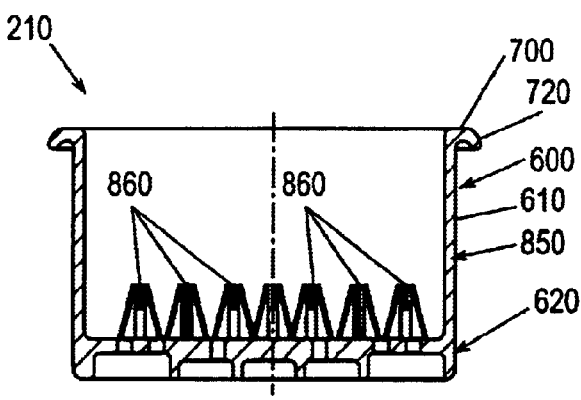
FIG. 18 is a side cross-sectional view of the pod of FIG. 16.

FIGS. 14 and 15 show a further embodiment of the cup 600. In this embodiment, the sidewall 610 of the cup 600 may include a number of over-cuts 760 formed therein. In this embodiment, a first over-cut 770 and a second over-cut 780 may be used. Any number of over-cuts 760, however, may be used. The over-cuts 760 may be continuous around the inner circumference of the side wall 610 or the over-cuts 760 may be intermittent. The over-cut 760 may cooperate with a lid 790. The lid 790 may have edges 800 that are substantially wedge shaped to fit and remain within the over-cut 760. The use of the wedge shaped edge 800 ensures that the lid 790 remains in place. The edges 800 may be continuous or intermittent so as to mate with the over-cut 760. The lid 790 preferably is bowed inward or largely concave in shape.

The lid 790 may be placed in the first or second over cut 770, 780 depending upon the amount of brewing material 550 that is desired to be placed within the cup 600. The lid 790 is bowed downward so as to tamp the brewing material 550 down under pressure and to keep the brewing material 550 therein from shifting. The lid 790 may compact the brewing material 550 with at least about nine (9) kilograms of compressive force (about twenty (20) pounds of force). The lid 790 also may have a number of apertures 810 therein so as to permit water from the injector head 420 to pass therethrough. Depending on the nature of the injector head 420, the use of the lid 790 may not be necessary. Instead, a foil wrapper or any other covering may be used. Likewise, the over-cuts 760 also may be eliminated or modified as desired.

FIGS. 16–19 show a further embodiment of the present invention, a spiked pod 850. The spiked pod 850 may use the cup 600, the side wall 610, the base 620, the lip 700, and the elements thereof as described above with the pod cartridge 210. The spiked pod 850 also may include a number of spikes 860 positioned along the floor 630 of the base 620. The spikes 860 may serve to puncture a package for the brewing material 550 as will be described in more detail below. In this embodiment, about eighteen (18) spikes 860 may be used. Any desired number of spikes, however, 860 may be used. The spikes 860 may be aligned along the radial ribs 680 of the base 620 or elsewhere along the floor 630.

Figure 19:
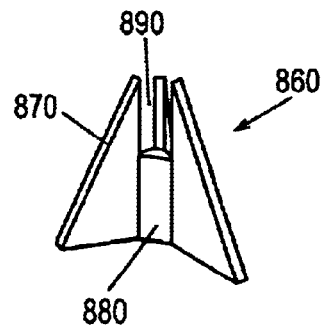
FIG. 19 is a perspective view of a spike used in the pod of FIG. 16.

As is shown in, for example, FIG. 19, the spikes 860 may include three (3) triangular blades 870 surrounding a base 880. The tips of the blades 870 may form a puncture area 890. The blades 860 may have any desired shape. The blades 870 may have a height of about 6.35 millimeters (about 0.25 inch) and the base 880 may have a height of about 3.8 millimeters (about 0.15 inches) such that the puncture area 890 may be about 2.54 millimeters (about 0.1 inches) in length above the base 880. Any desired size, however, may be used.

In use, the lower layer 580 of filter paper may be placed with the cup 600 of the pod cartridge 210. The lower layer 580 may be positioned along the floor 630 of the base 620. An amount of the brewing material 550 then may be positioned therein. The upper layer 570 of the filter paper then may be placed on the brewing material 550 if desired. The lid 790 then may be placed within the cup 600 so as to tap down the brewing material 550. Once the lid 790 has compacted the brewing material 550, the edge 800 of the lid 790 is positioned within the appropriate over-cut 760 within the side wall 610 of the cup 600. The pod 210 then may be sealed or otherwise shipped for use with the beverage dispenser system 100 or otherwise.

The pod 210 may be positioned within one of the pod apertures 330 in the turret assembly 310. Specifically, the outer edge of the pod aperture 330 aligns with the flange 720 of the lip 700 of the cup 600. A pod or other device with a convention square lip would extend too far out of the pod aperture 330 to function with the injection head 420 of the injector assembly 310. The injector head 420 then may be positioned about the pod 210. The sealing ring 630 of the injector head 420 may seal about the top portion 710 of the lip 700 of the cup 600. The use of a rounded lip or a lip with a non-flat shape may cause damage to the sealing ring 430 given the amount of pressure involved, i.e., as described above, the injector head 420 may engage the pod cartridge 210 with a downward force of about 136 to about 160 kilograms of force (about 300 to about 350 pounds) and the incoming water flow may be pressurized at about eleven (11) to about fourteen (14) kilograms per square centimeter (about 160 to 200 pounds per square inch (psi)). The pressure of the water flowing through pod cartridge 210 may vary with the nature of the brewing material 550 from about 1.4 to about 14 kilograms per square centimeter (about twenty (20) to about 200 pounds per square inch).

The water passing through the injection head 420 may spread out over the lid 790 and the apertures 810 thereof and into the brewing material 550. The brewed beverage may then pass through the apertures 640 in the base 620 of the cup 600.

The lip 700 as well as the base 620 of the cup 600 are designed to use as little material as possible while being able to withstand the water pressures described above with out deformation. The cup 600 as a whole may have about five (5) to about eight (8) grams of plastic material therein when using, for example, polypropylene homopolymer. The configuration of the lip 700 may save about 0.4 to about 0.6 grams or about ten percent (10%) of the plastic required.

In the embodiment of the spiked pod 850, the brewing material 550 may be positioned within the foil envelope 590. At least the lower filter layer 580 also may be placed within the cup 600. The injection nozzle 200 may penetrate the foil envelope 590 or water may otherwise flow into the cup 600 with the water pressure described above. This water pressure may force both the lower filer layer 580 and the foil envelope 590 against the spikes 860 of the spiked pod 850. This pressure may allow these spikes 860 to penetrate both the lower filter area 580 and the foil envelop 590. The punctures caused by the spikes 860 may allow the brewed beverage to pass therethrough while substantially maintaining the remaining brewing material 550 therein. The spikes 860 may provide substantially uniform penetration of the foil envelope 590. The brewing material 590 also may be contained within other types of structures that may be penetrated by the spikes 860.

It should be apparent that the foregoing relates only to the preferred embodiments of the present invention and that numerous changes and modifications may be made herein without departing from the spirit and scope of the invention as defined by the following claims and the equivalents thereof.

What is claim is:

1. A container for holding ground coffee or tealeaves, comprising:
    a body;
    a lip extending from said body;
    said lip comprising a top substantially flat surface; and
    a lid to be positioned within said body;
    said lid comprising a concave shape;
    wherein said body comprises one or more cuts therein for said lid.
2. The container of claim 1, further comprising polystyrene, polyethylene, or polypropylene.
3. The container of claim 1, wherein said body comprises a sidewall and a base.
4. The container of claim 3, wherein said base comprises a plurality of apertures therein.
5. The container of claim 3, wherein said base comprises a plurality of support ribs thereon.
6. The container of claim 3, wherein said base comprises a plurality of spikes thereon.
7. The container of claim 1, wherein said lip comprises a flange extending from said flat surface.

8. The container of claim 7, wherein said flange extends downwardly at an angle so as to from a pocket with said body.

9. The container of claim 8, wherein said pocket comprises an upper curved radius.

10. The container of claim 1, wherein said lid comprises a plurality of apertures therein.

11. The container of claim 1, further comprising one or more layers of filter paper positioned within said body.

12. The container of claim 1, further comprising a foil envelope for holding the ground coffee or the tealeaves.

13. A container for holding ground coffee or tealeaves, comprising:
   a body; and
   a lip extending from said body;
   said lip comprising a top substantially flat surface; and
   a width of no more than about 2.6 millimeters (about 0.1 inch);
   said body comprises a base with a plurality of spikes thereon; and
   wherein each of said plurality of spikes comprises a base surrounded by a plurality of blades.

14. A container for holding ground coffee or tealeaves, comprising:
   a body;
   a lip extending from said body;
   said lip comprising a top substantially flat surface; and
   a width of no more than about 2.6 millimeters (about 0.1 inch); and
   a lid to be positioned within said body;
   wherein said lid comprises a concave shape.

15. A container for holding ground coffee or tealeaves, comprising:
   a body;
   a lip extending from said body;
   said lip comprising a lop substantially flat surface; and
   a width of no more than about 2.6 millimeters (about 0.1 inch); and
   a lid to be positioned within said body;
   wherein said body comprises one or more cuts therein for said lid.

16. A container for holding ground coffee or tealeaves, comprising:
   a base;
   said base comprising a plurality of apertures therein;
   a circular sidewall extending from said base; and
   a lip extending from said sidewall;
   said lip comprising a top substantially flat surface; and
   a flange extending downwardly from said flat surface;
   said flange comprising a curved inner radius.

17. The container of claim 16, wherein said flange comprises a width of no more than about 2.6 millimeters (about 0.1 inch).

18. The container of claim 16, wherein said base comprises a plurality of spikes thereon.

* * * * *